(12) United States Patent
Trail (10) Patent No.: US 10,708,577 B2
(45) Date of Patent: Jul. 7, 2020

(54) RANGE-GATED DEPTH CAMERA ASSEMBLY

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 528 days.

(21) Appl. No.: 15/372,779

(22) Filed: Dec. 8, 2016

(65) Prior Publication Data

US 2017/0180713 A1   Jun. 22, 2017

Related U.S. Application Data

(60) Provisional application No. 62/268,488, filed on Dec. 16, 2015.

(51) Int. Cl.
| | | |
|---|---|---|
| *H04N 13/344* | (2018.01) | |
| *H04N 13/254* | (2018.01) | |
| *H04N 13/296* | (2018.01) | |
| *G01S 17/89* | (2020.01) | |
| *G06F 3/03* | (2006.01) | |
| *G06F 3/01* | (2006.01) | |

(Continued)

(52) U.S. Cl.
CPC .......... *H04N 13/344* (2018.05); *G01S 17/18* (2020.01); *G01S 17/89* (2013.01); *G02B 27/0025* (2013.01); *G06F 3/011* (2013.01); *G06F 3/0304* (2013.01); *H04N 13/254* (2018.05); *H04N 13/296* (2018.05); *H04N 13/271* (2018.05)

(58) Field of Classification Search
None
See application file for complete search history.

(56) References Cited

U.S. PATENT DOCUMENTS

| | | |
|---|---|---|
| 2005/0157204 A1 | 7/2005 | Marks |
| 2012/0051588 A1 | 3/2012 | McEldowney |

(Continued)

FOREIGN PATENT DOCUMENTS

| | | |
|---|---|---|
| CN | 104364673 | 2/2015 |
| KR | 10-2015-0129187 A | 11/2015 |
| WO | WO 2014/014838 A2 | 1/2014 |

OTHER PUBLICATIONS

PCT International Search Report and Written Opinion, PCT Application No. PCT/US2016/065985, dated Mar. 23, 2017, 14 pages.

(Continued)

*Primary Examiner* — Stuart D Bennett
(74) *Attorney, Agent, or Firm* — Fenwick & West LLP (57) ABSTRACT

An augmented reality (AR) includes a depth camera assembly (DCA) to capture images of various depth zones of scenes of a local area. The DCA can focus on specific ranges in a scene, important aspects, and/or regions of interest. The DCA generates image data of the local area such that the image includes information pertaining to a single depth zone. The captured image is specific to the single depth zone and is representative of objects within the single depth zone. The DCA uses the generated image data for the depth zones to generate augmented or partially-augmented images that include depth information for the objects in the local area.

20 Claims, 5 Drawing Sheets

(51) Int. Cl.
*G01S 17/18* (2020.01)
*G02B 27/00* (2006.01)
*H04N 13/271* (2018.01)

(56) References Cited

U.S. PATENT DOCUMENTS

| | | |
|---|---|---|
| 2014/0282275 A1 | 9/2014 | Everitt et al. |
| 2015/0160340 A1* | 6/2015 | Grauer ............... G01S 17/89 356/5.04 |
| 2015/0261318 A1 | 9/2015 | Scavezze et al. |
| 2016/0006914 A1* | 1/2016 | Neumann ............ G06F 3/0325 348/78 |
| 2016/0171759 A1* | 6/2016 | Kao ..................... G06T 17/20 345/423 |
| 2016/0210525 A1* | 7/2016 | Yang .................... G06K 9/0063 |
| 2016/0266273 A1* | 9/2016 | Wurzbach ........... G01V 5/0025 |

OTHER PUBLICATIONS

European Patent Office, Extended European Search Report, European Patent Application No. 16876429.8, dated Apr. 23, 2019, 8 pages.
National Intellectual Property Administration, Chinese Office Action, Chinese Patent Application No. 201680072127.1, dated Sep. 30, 2019, 8 pages.

* cited by examiner

RANGE-GATED DEPTH CAMERA ASSEMBLY

CROSS-REFERENCE TO RELATED APPLICATION

This application claims the benefit of U.S. Provisional Patent Application Ser. No. 62/268,488, titled "Range-gated Depth Camera Assembly," filed on Dec. 16, 2015, which is incorporated by reference herein in its entirety.

BACKGROUND

The present disclosure generally relates to depth camera architectures and more specifically relates to a range-gated depth camera assembly.

Virtual reality (VR) systems, which may include augmented reality (AR) systems, can leverage the capture of the environment surrounding a user in three dimensions (3D). However, traditional depth camera architectures are comparably large in size, heavy, and consume significant amounts of power. Moreover, different depth camera architectures (e.g., time-of-flight, structured light, and stereo vision) generally perform best in different operating environments, as they each have different strengths/weaknesses. Additionally, traditional depth camera architectures are not suited to expanded operational ranges (centimeters to multiple meters) found in VR system. For example, such expanded operational ranges may result in too much data for traditional depth camera architectures to efficiently process, and may possess dynamic ranges that are too large for traditional depth camera architectures to handle.

SUMMARY

A headset include in an augmented reality (AR) system or in a virtual reality (VR) system includes a depth camera assembly (DCA) enabling capture of visual information of various depth zones of a scene of an area surrounding the headset and within a field of view of an imaging device included in the headset (i.e., a "local area"). The DCA can focus on specific ranges in a scene, important aspects, and/or regions of interest. The DCA includes one or more imaging devices, an illumination source, and a controller. The illumination source emits light pulses (e.g., infrared (IR), visible) used to create augmented images. The imaging device records light over an exposure time period to generate image data.

The DCA illuminates a scene of a local area with one or more light pulses. Objects in the local area reflect light (i.e., light pulses) emitted by the DCA. The DCA is configured to generate image data of the local area such that the image includes information pertaining to a single depth zone (e.g., by controlling a time between emitting a light pulse and image capture). The captured image is specific to the single depth zone and is representative of objects within the single depth zone. The DCA generates image data for each of the depth zones. The DCA uses the generated image data for the depth zones to generate augmented or partially-augmented images. An augmented image is an image of the local area that includes depth information (i.e., distance from an object to the DCA) for one or more objects in the local area. A partially augmented image includes image data for some, but not all, of the depth zones in a local area.

Note, in some embodiments, multiple pulses are emitted for a given depth zone before reading out image data associated with the given depth zone. This improves a signal strength associated with image data in the given depth zone, as light from successive pulses are added. The DCA can then read out image data that was generated using a plurality of pulses (e.g., 100 pulses as an example). The improved signal strength is useful in capturing accurate image data for objects with low reflectivity and/or objects that are distant from the DCA. Likewise, the DCA can set the number of pulses to control image saturation.

In one embodiment, a range-gated depth camera assembly includes an illumination source configured to emit illumination light pulses and an imaging device configured to generate image data of a local area. The range-gated depth camera assembly further includes a controller. The controller is configured to regulate the illumination source to emit a plurality of illumination light pulses to illuminate a scene of a local area. The local area is divided into a plurality of depth zones including at least one non-empty depth zone that includes at least one object an imaging device configured to generate image data of a local area. The controller is configured to, for each non-empty depth zone of the plurality of depth zones, regulate the imaging device to record a set of reflected light pulses to generate image data for the non-empty depth zone. The set of reflected light pulses are the illumination light pulses reflected off one or more objects included in the non-empty depth zone. The controller is further configured to generate an image of the scene using the image data generated for the at least one non-empty depth zone of the plurality of non-empty depth zones, and provide the image of the scene to a console.

In one embodiment, a head-mounted display (HMD) includes an electronic display and a range-gated depth camera assembly that includes an illumination source configured to emit illumination light pulses and an imaging device configured to generate image data of a local area. The HMD further includes a controller configured to includes a controller. The controller is configured to regulate the illumination source to emit a plurality of illumination light pulses to illuminate a scene of a local area. The local area is divided into a plurality of depth zones including at least one non-empty depth zone that includes at least one object an imaging device configured to generate image data of a local area. The controller is configured to, for each non-empty depth zone of the plurality of depth zones, regulate the imaging device to record a set of reflected light pulses to generate image data for the non-empty depth zone. The set of reflected light pulses are the illumination light pulses reflected off one or more objects included in the non-empty depth zone. The controller is further configured to generate an image of the scene using the image data generated for the at least one non-empty depth zone of the plurality of non-empty depth zones, and provide the image of the scene to a console.

In one embodiment, a method includes emitting, by an illumination source, a plurality of illumination light pulses to illuminate a scene of a local area. The local area is divided into a plurality of depth zones comprising at least one non-empty depth zone. The non-empty depth zone includes at least one object. The method further includes, for each depth zone of the plurality of depth zones, recording a set of reflected light pulses to generate image data for the non-empty depth zone. The set of reflected light pulses is the illumination light pulses reflected off one or more objects included in the non-empty depth zone. The method further includes generating an image of the scene using the image data generated for the at least one non-empty depth zone of the plurality of non-empty depth zones. The method further includes providing the image of the scene to a console.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
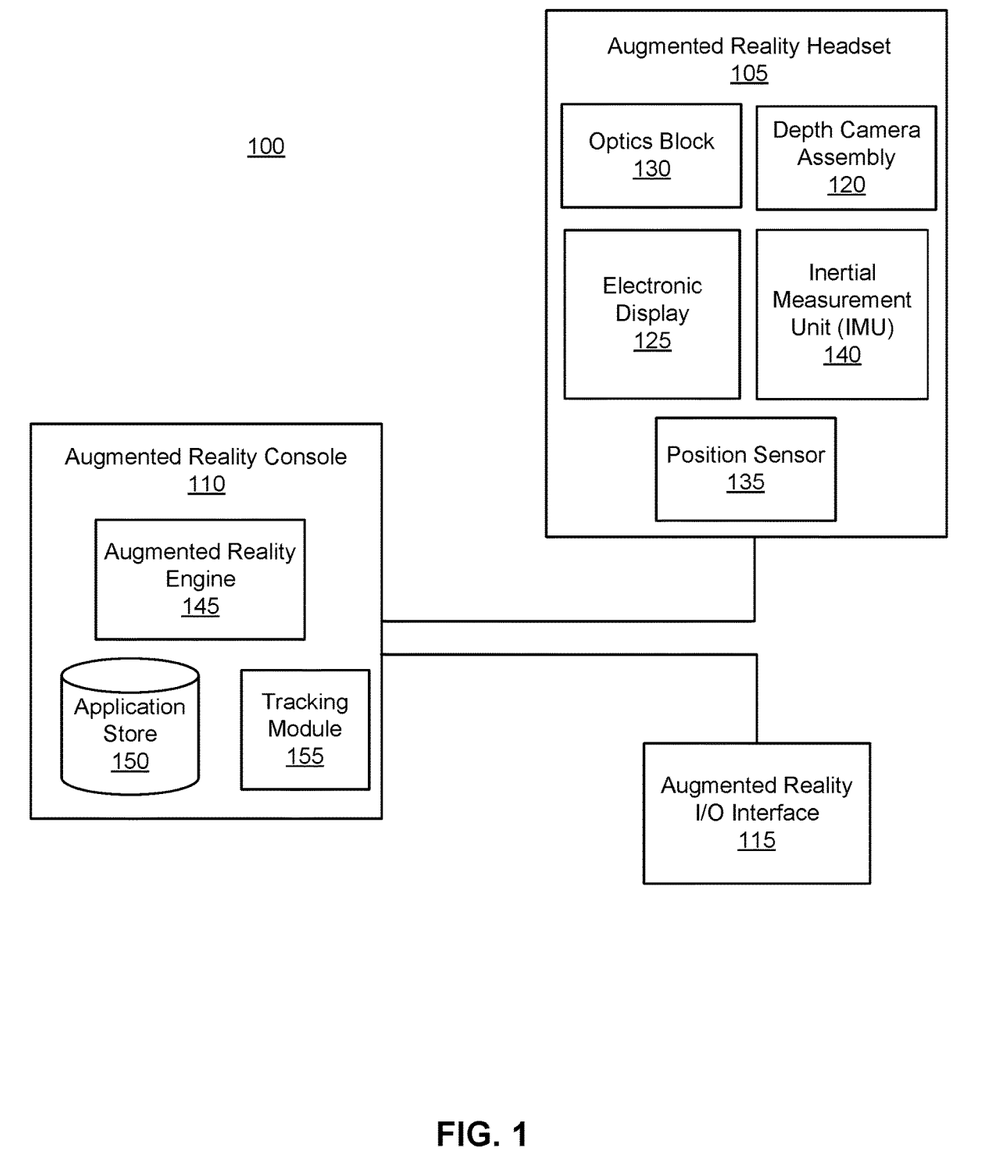
FIG. 1 is a block diagram of a system environment including an augmented reality system, in accordance with an embodiment.

FIG. 1 is a block diagram of one embodiment of an augmented reality (AR) system environment 100 in which an AR console 110 operates. As used herein, an AR system environment 100 may also include virtual reality system environments that present users with virtual environments with which the user may interact. The AR system environment 100 shown by FIG. 1 comprises an AR headset 105 and an AR input/output (I/O) interface 115 that are each coupled to an AR console 110. While FIG. 1 shows an example system 100 including one AR headset 105 and one AR I/O interface 115, in other embodiments any number of these components may be included in the AR system environment 100. For example, there may be multiple AR headsets 105 each having an associated AR I/O interface 115, with each AR headset 105 and AR I/O interface 115 communicating with the AR console 110. In alternative configurations, different and/or additional components may be included in the AR system environment 100. Additionally, functionality described in conjunction with one or more of the components shown in FIG. 1 may be distributed among the components in a different manner than described in conjunction with FIG. 1 in some embodiments. For example, some or all of the functionality of the AR console 110 is provided by the AR headset 105.

The AR headset 105 is a head-mounted display that presents content to a user comprising augmented views of a physical, real-world environment with computer-generated elements (e.g., two dimensional (2D) or three dimensional (3D) images, 2D or 3D video, sound, etc.). In some embodiments, the presented content includes audio that is presented via an external device (e.g., speakers and/or headphones) that receives audio information from the AR headset 105, the AR console 110, or both, and presents audio data based on the audio information. An embodiment of the AR headset 105 is further described below in conjunction with FIGS. 2 and 3. The AR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The AR headset 105 includes a DCA 120, an electronic display 125, an optics block 130, one or more position sensors 135, and an inertial measurement Unit (IMU) 140. Some embodiments of the AR headset 105 have different components than those described in conjunction with FIG. 1. Additionally, the functionality provided by various components described in conjunction with FIG. 1 may be differently distributed among the components of the AR headset 105 in other embodiments.

The DCA 120 is configured to capture one or more images of an area proximate to the AR headset 105, also referred to as a "local area," using the one or more imaging devices included in the DCA 120. Some embodiments of the DCA 120 include one or more imaging devices (e.g., a camera, a video camera), an illumination source, and a controller. The illumination source emits light pulses (e.g., infrared (IR), visible) used to create augmented images. For example, the illumination source emits a series of light pulses for a predetermined time period. In some embodiments, the illumination source may be a structured light (SL) illuminator that is configured to emit a SL pattern, such as a symmetric or quasi-random dot pattern, grid, or horizontal bars, onto a scene.

The DCA 120 captures images of the local area using one or more imaging devices. The imaging devices capture and record particular ranges of wavelengths of light (i.e., "bands" of light). Example bands of light captured by an imaging device include: a visible band (~380 nm to 750 nm), an infrared (IR) band (~750 nm to 1500 nm), an ultraviolet band (10 nm to 380 nm), another portion of the electromagnetic spectrum, or some combination thereof. The one or more imaging devices may also be sensitive to light having visible wavelengths as well as light having IR wavelengths or wavelengths in other portions of the electromagnetic spectrum. For example, the imaging devices are red, green, blue, IR (RGBI) cameras. In some embodiments, the one or more imaging devices comprise a charge coupled device (CCD), a complementary metal-oxide-semiconductor (CMOS) imager, other light sensitive device, or some combination thereof.

The DCA 120 may vary different characteristics of emitted light pulses. For example, the DCA 120 may vary, e.g., a pulse width, a pulse amplitude, a time between pulses, a quantity of pulses to emit, a pulse wavelength, or some combination thereof. As discussed in detail below the DCA 120 may vary pulse characteristics (e.g., pulse amplitude, quantity of pulses, etc.) to prevent saturation of a captured image and to ensure image quality of the captured image. Additionally, the DCA 120 regulates when image data is collected by controlling e.g., an exposure time period to record light to generate image data and/or a start time for an exposure time period (relative to when a pulse was emitted by the DCA 120).

The local area may include objects at different distances from the VR headset 105. In some embodiments, the DCA 120 scans the local area to identify objects included in the local area. The DCA 120 then determines a distance between each identified object and the DCA 120. The DCA 120 divides the local area into one or more depth zones based on the determined distances to the identified objects. Alternatively, the DCA 120 divides the local area into a predetermined number of depth zones.

The DCA 120 captures image data of the depth zone(s) one at a time. The DCA 120 controls when a light pulse is emitted relative to when image data is to be collected. Accordingly, the DCA 120 is able to selectively collect image data specific to a depth zone. For a particular depth zone, the DCA 120 illuminates the depth zone (e.g., by a light pulse) and captures light being reflected off objects included in the depth zone. The DCA 120 uses the captured images of one or more depth zones to generate an augmented image. An augmented image is an image of the local area that includes depth information (i.e., distance from an object to the DCA) for one or more objects in the local area. DCA 120 is further described below in conjunction with FIGS. 3-5.

The electronic display 125 displays 2D or 3D images to the user in accordance with data received from the AR console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof. In some embodiments, portions (e.g., a front side) of the AR headset 105 are transparent to visible light, to allow a user of the headset to view the local area through the AR headset 105. In these embodiments, the electronic display 125 is made up of one or more transparent electronic display panels. A transparent electronic display panel is partially or fully transparent and may be, for example, a transparent organic light emitting diode display (TOLED), some other transparent electronic display, or some combination thereof.

The optics block 130 magnifies image light received from the electronic display 125, corrects optical errors associated with the image light, and presents the corrected image light to a user of the AR headset 105. In various embodiments, the optics block 130 includes one or more optical elements. Example optical elements included in the optics block 130 include: an aperture, a Fresnel lens, a convex lens, a concave lens, a filter, a mirror element, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, comatic aberrations or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the AR headset 105 based on measurement signals received from one or more of the position sensors 135 and from depth information received from the DCA 120. A position sensor 135 generates one or more measurement signals in response to motion of the AR headset 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the AR headset 105 relative to an initial position of the AR headset 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the AR headset 105 from the sampled data. For example, the IMU 140 integrates the measurement signals received from the accelerometers over time to estimate a velocity vector and integrates the velocity vector over time to determine an estimated current position of a reference point on the AR headset 105. Alternatively, the IMU 140 provides the sampled measurement signals to the AR console 110, which interprets the data to reduce error. The reference point is a point that may be used to describe the position of the AR headset 105. The reference point may generally be defined as a point in space or a position related to the AR headset's 105 orientation and position.

The IMU 140 receives one or more parameters from the AR console 110. As further discussed below, the one or more parameters are used to maintain tracking of the AR headset 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the AR headset 105, the IMU 140 may be a dedicated hardware component. In other embodiments, the IMU 140 may be a software component implemented in one or more processors.

The AR I/O interface 115 is a device that allows a user to send action requests and receive responses from the AR console 110. An action request is a request to perform a particular action. For example, an action request may be an instruction to start or end capture of image or video data or an instruction to perform a particular action within an application. The AR I/O interface 115 may include one or more input devices. Example input devices include: a keyboard, a mouse, a game controller, or any other suitable device for receiving action requests and communicating the action requests to the AR console 110. An action request received by the AR I/O interface 115 is communicated to the AR console 110, which performs an action corresponding to the action request. In some embodiments, the AR I/O interface 115 includes an IMU 140, as further described above, that captures calibration data indicating an estimated position of the AR I/O interface 115 relative to an initial position of the AR I/O interface 115. In some embodiments, the AR I/O interface 115 may provide haptic feedback to the user in accordance with instructions received from the AR console 110. For example, haptic feedback is provided when an action request is received, or the AR console 110 communicates instructions to the AR I/O interface 115 causing the AR I/O interface 115 to generate haptic feedback when the AR console 110 performs an action.

The AR console 110 provides content to the AR headset 105 for processing in accordance with information received from one or more of: the DCA 120, the AR headset 105, and the AR I/O interface 115. In the example shown in FIG. 1, the AR console 110 includes an application store 150, a tracking module 155 and an AR engine 145. Some embodiments of the AR console 110 have different modules or components than those described in conjunction with FIG. 1. Similarly, the functions further described below may be distributed among components of the AR console 110 in a different manner than described in conjunction with FIG. 1.

The application store 150 stores one or more applications for execution by the AR console 110. An application is a group of instructions, that when executed by a processor, generates content for presentation to the user. Content generated by an application may be in response to inputs received from the user via movement of the AR headset 105 or the AR I/O interface 115. Examples of applications include: gaming applications, conferencing applications, video playback applications, or other suitable applications.

The tracking module 155 calibrates the AR system environment 100 using one or more calibration parameters and may adjust one or more calibration parameters to reduce error in determination of the position of the AR headset 105 or of the AR I/O interface 115. Calibration performed by the tracking module 155 also accounts for information received from the IMU 140 in the AR headset 105 and/or an IMU 140 included in the AR I/O interface 115. Additionally, if tracking of the AR headset 105 is lost (e.g., the DCA 120 loses line of sight of at least a threshold number of SL elements), the tracking module 140 may re-calibrate some or all of the AR system environment 100.

The tracking module 155 tracks movements of the AR headset 105 or of the AR I/O interface 115 using information from the DCA 120, the one or more position sensors 135, the IMU 140 or some combination thereof. For example, the tracking module 155 determines a position of a reference point of the AR headset 105 in a mapping of a local area based on information from the AR headset 105. The tracking module 155 may also determine positions of the reference point of the AR headset 105 or a reference point of the AR I/O interface 115 using data indicating a position of the AR headset 105 from the IMU 140 or using data indicating a position of the AR I/O interface 115 from an IMU 140 included in the AR I/O interface 115, respectively. Additionally, in some embodiments, the tracking module 155 may use portions of data indicating a position or the AR headset 105 from the IMU 140 as well as representations of the local area from the DCA 120 to predict a future location of the AR headset 105. The tracking module 155 provides the estimated or predicted future position of the AR headset 105 or the AR I/O interface 115 to the AR engine 145.

The AR engine 145 generates a 3D mapping of the area surrounding the AR headset 105 (i.e., the "local area") based on information received from the AR headset 105. In some embodiments, the AR engine 145 determines depth information for the 3D mapping of the local area based on times for light emitted by the DCA 120 to be detected by the DCA 120 after being reflected by one or more objects in the area surrounding the AR headset 105 or based on images of deformed SL elements captured by the DCA 120 of the AR headset 105. In various embodiments, the AR engine 145 uses different types of information determined by the DCA 120 or a combination of types of information determined by the DCA 120.

The AR engine 145 also executes applications within the AR system environment 100 and receives position information, acceleration information, velocity information, predicted future positions, or some combination thereof, of the AR headset 105 from the tracking module 155. Based on the received information, the AR engine 145 determines content to provide to the AR headset 105 for presentation to the user. For example, if the received information indicates that the user has looked to the left, the AR engine 145 generates content for the AR headset 105 that mirrors the user's movement in a virtual environment or in an environment augmenting the local area with additional content. Additionally, the AR engine 145 performs an action within an application executing on the AR console 110 in response to an action request received from the AR I/O interface 115 and provides feedback to the user that the action was performed. The provided feedback may be visual or audible feedback via the AR headset 105 or haptic feedback via the AR I/O interface 115.

Figure 2:
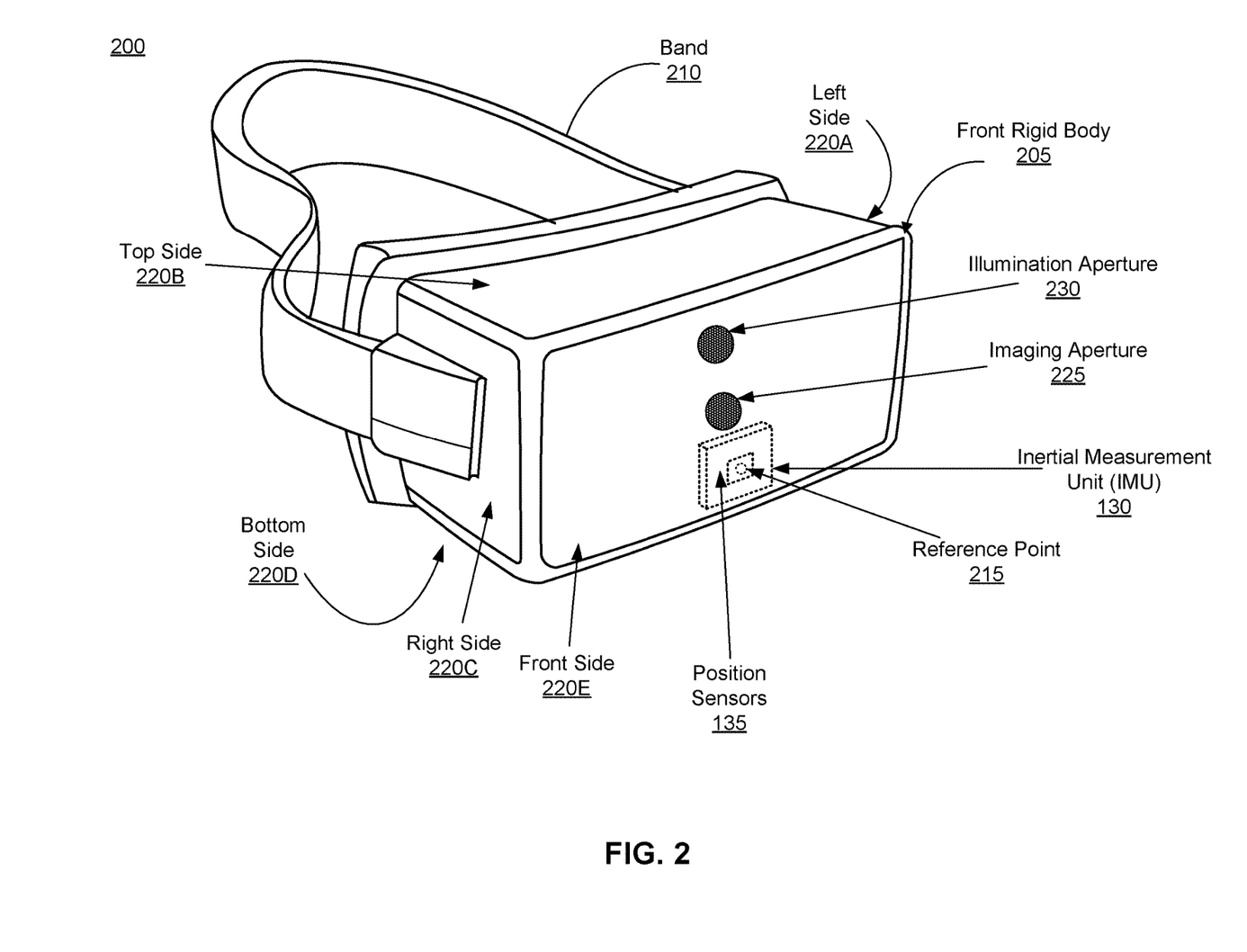
FIG. 2 is a diagram of an augmented reality headset, in accordance with an embodiment.

FIG. 2 is a wire diagram of one embodiment of an AR headset 200. The AR headset 200 is an embodiment of the AR headset 105, and includes a front rigid body 205, a band 210, a reference point 215, a left side 220A, a top side 220B, a right side 220C, a bottom side 220D, and a front side 220E. The AR headset 200 shown in FIG. 2 also includes an embodiment of a depth camera assembly (DCA) (not shown) which is further described below in conjunction with FIGS. 3-5. The front rigid body 205 includes one or more electronic display elements of the electronic display 125 (not shown), the IMU 130, an imaging aperture 225 and an illumination aperture 230 to allow light to pass through, the one or more position sensors 135, and the reference point 215. In some embodiments, portions of the front rigid body 205 may be transparent (e.g., the front side 220E, some other side, etc.) to visible light to allow a user to view the local area through the transparent portions of the front rigid body 205.

Figure 3:
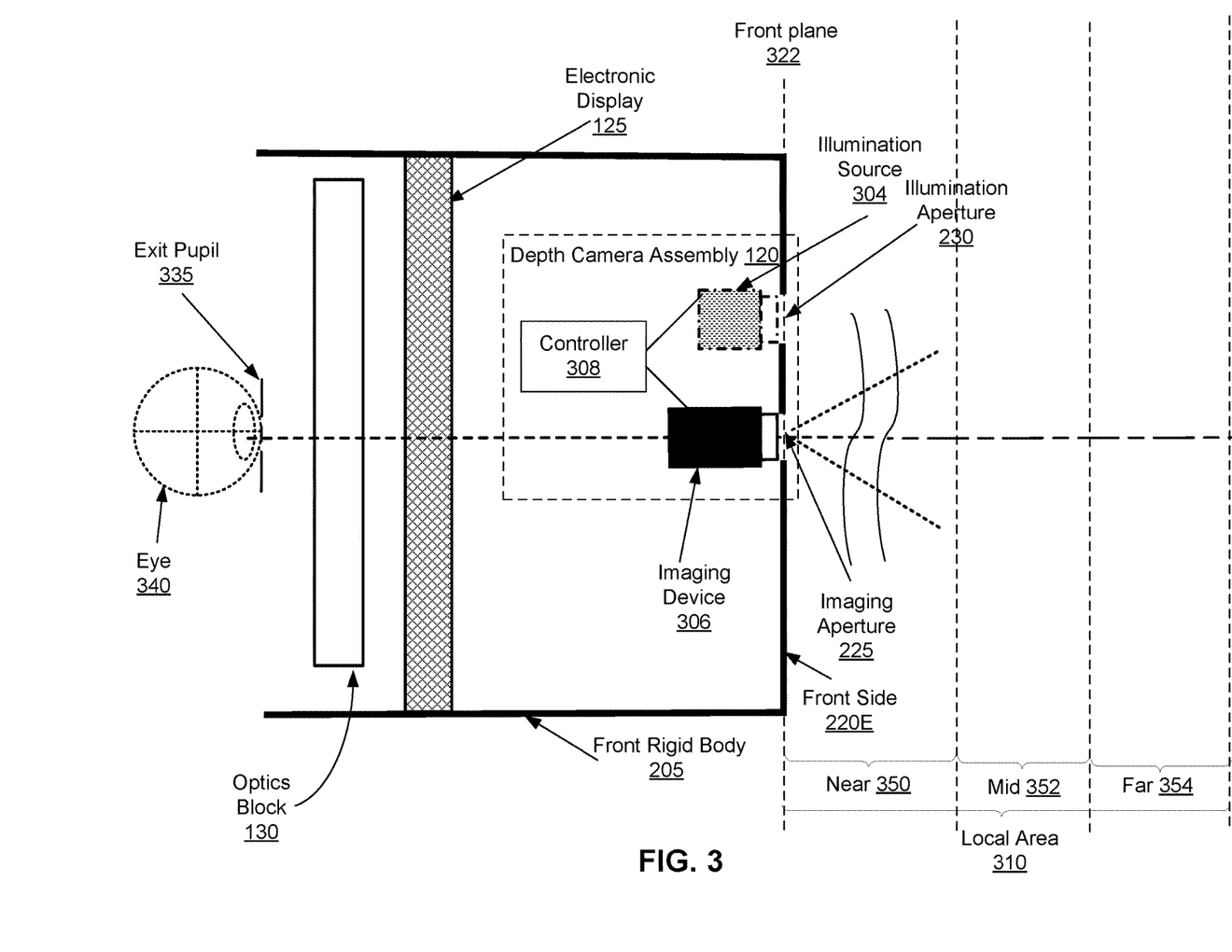
FIG. 3 is a cross section of a front rigid body of a augmented reality headset, in accordance with an embodiment.

FIG. 3 is a cross section of the front rigid body 205 of the AR headset 200 depicted in FIG. 2. As shown in FIG. 3, the front rigid body 205 includes the DCA 120 that includes an illumination source 304, an imaging device 306, and a controller 308. Additionally, the front rigid body 205 includes the electronic display 125, the optics block 130, the imaging aperture 225, and the illumination aperture 230, which are further described above in conjunction with FIGS. 1-2. The front rigid body 205 also includes an exit pupil 335 where the user's eye 340 would be located. In various embodiments, the illumination source 304 and the imaging device 306 are the front side 220E. In some embodiments, the imaging device 306 captures images of a local area 310, which is a portion of an environment surrounding the front rigid body 205 within a field of view of the imaging device 306. For purposes of illustration, FIG. 3 shows a cross section of the front rigid body 205 in accordance with a single eye 340. In some embodiments, the DCA 120 or some components of the DCA are in line with the user's eye 340. In other embodiments, the components of the DCA are not in line with the user's eye 340.

The electronic display 125 emits light forming an image toward the optics block 130, which alters the light received from the electronic display 125. The optics block 130 directs the altered image light to the exit pupil 335, which is a location of the front rigid body 205 where a user's eye 340 is positioned. FIG. 3 shows a cross section of the front rigid body 205 for a single eye 340 of the user, with another electronic display 125 and optics block 130, separate from those shown in FIG. 3, included in the front rigid body 205 to present content, such as an augmented representation of the local area 310 or virtual content, to another eye of the user.

The DCA 120 includes the illumination source 304, the imaging device 306, and the controller 308. The illumination source 304 generates pulses of light used to determine depth information associated with the local area 310. The illumination source 304 generates one or more light pulses in response to receiving an instruction including an illumination parameter from the controller 308. An illumination parameter is an instruction used by an illumination source to generate one or more light pulses. An illumination parameter may be, e.g., a trigger signal to send one or more light pulses, a pulse width, a pulse amplitude, a pulse period, a duty cycle, a quantity of pulses to emit, a pulse wavelength, or some combination thereof. A light pulse may be a single pulse or a train of pulses (also referred to as a comb pulse) that include a series of pulses that have a specific period.

The illumination source 304 generates one or more light pulses in one or more bands such as a visible band (~380 nm to 750 nm), an infrared (IR) band (~750 nm to 1500 nm), an ultraviolet band (10 nm to 380 nm), another portion of the electromagnetic spectrum, or some combination thereof. The generated light may be coherent, semi-coherent, and/or incoherent. The illumination source 304 may generate light pulses at a frame rate (e.g., 120 Hz, 240 Hz, etc.) of the imaging device 306. In situations where a series of pulses is expected for a given frame at the imaging device 306, the illumination source 304 may generate light pulses significantly faster than the frame rate (e.g. 100, 10,000 or upwards times the frame-rate). Additionally, there is low jitter (on the order of several nanoseconds or less) in the latency time between triggering the illumination source 304 to generate a pulse (or series of pulses) and the illumination source 304 generating the pulse (or series of pulses), and low error in the measured latency. The illumination source 304 projects the one or more light pulses out of the illumination aperture 230 onto the local area 310.

The imaging device 306 generates image data of the local area 310 through the imaging aperture 225. The imaging device 306 captures image data responsive to receiving an instruction including an exposure parameter from the controller 308. An exposure parameter is an instruction used by an imaging device to generate image data. An exposure parameter may be, e.g., a trigger signal to record light thereby to generate image data, an exposure time period to record light thereby to generate image data, a start time for an exposure time period, or a start time and length of exposure for each pulse in the expected series, or some combination thereof.

The imaging device 306 detects and conveys the information carried in the light it captures into signals. The imaging device 306 is configured to capture images at least in the same spectrum as the illumination source 304. The imaging device 306 may also be sensitive to visible light, IR light, or light having wavelengths in other portions of the electromagnetic spectrum. In some embodiments, the imaging device 306 is a camera and comprises a charge coupled device (CCD), a complementary metal-oxide-semiconductor (CMOS) imager, other light sensitive device, or some combination thereof. Additionally, there is low jitter (on the order of several nanoseconds) between triggering the imaging device 306 to start an exposure (i.e., capture an image) and the imaging device 306 starting the exposure. Similarly, there is low jitter (on the order of several nanoseconds) between triggering the imaging device 306 to stop an exposure (i.e., stop the capture of an image) and the imaging device 306 stopping the exposure. In addition, knowledge of the actual start and stop time would be accurate to a fraction of the jitter value (e.g., below a nanosecond).

The controller 308 regulates the illumination source 304 using illumination parameters. The controller 308 provides one or more instructions including one or more illumination parameters to the illumination source 304 that emits light pulse(s) in accordance with the one or more illumination parameters. The controller 308 determines the one or more illumination parameters such that between each light pulse there is at least a time period that allows for a light pulse to clear the local area. For example, if the local area 310 is 20 feet long, then a time between pulses would be at least 40 nanoseconds—as light travels at approximately 1 foot-per-nanosecond. The controller 308 may determine the frequency of light pulses emitted by the illumination source 304 based on a size of the local area 310. In addition, the controller 308 can set the pulse width (on the order or nanoseconds) for each emitted pulse, and the specific amplitude of the pulse (emitted power) on a pulse-by-pulse or frame-by-frame basis. In some embodiments, an illumination parameter may be a trigger and at least one pulse characteristic of a light pulse emitted by the illumination source 304 is determined at the illumination source 304. For instance, the controller 308 may regulate the illumination source 304 to emit a light pulse having a specific pulse width (e.g., 6 ns), however, the pulse amplitude is determined by illumination source 304.

The controller 308 regulates the imaging device 306 to capture reflected light to generate image data of the local area 310. The controller 308 provides one or more instructions including one or more exposure parameters (e.g., an exposure time period to capture reflected light, a start time for an exposure time period, and repetition frequency/count for every read-out frame, etc.) to the imaging device 306. As such, the controller 308 regulates an exposure start time, an exposure duration, and repeat count to the imaging device 306. During the exposure time period the imaging device 306 records light and converts light into image data. The controller 308 may determine the exposure start time according to a distance to a depth zone from the DCA 120. The size of a depth zone depends on the length of the exposure time period. Accordingly, the controller 308 may determine the exposure time period according a size of the depth zone. The location of the depth zone is determined by the start time of the exposure period relative to the time the pulse was emitted from the illumination source 304. Accordingly, the controller 308 may select which depth zone to collect image data on by adjusting the start time of the exposure period relative to the time the pulse was emitted from the illumination source 304. For example, the controller 308 determines an exposure start time based on a distance $D_{near}$ of a near border (border of a depth zone closer to DCA 120) of the depth zone to the front plane 322. A time difference between the start time and the time point when the illumination source 304 is triggered to emit a light pulse equals to twice $D_{near}$ divided by a speed of light (e.g., ~$3 \times 10^8$ meters/second). As such, the controller 308 regulates the imaging device 306 to capture light reflected off all objects of the depth zone.

Objects included in the local area 310 reflect incident ambient light as well as light emitted by the illumination source 304 onto the local area 310. The local area 310 includes one or more depth zones at different distances from the front plane 322. A depth zone includes objects in the local area that are within a predetermined distance range from the front plane 322. For example, the local area 310 includes a near-depth zone 350, a mid-depth zone 352, and a far-depth zone 354. The near-depth zone 350 includes objects that are within a first predetermined distance range (e.g., less than one meter) from the front plane 322. The mid-depth zone 352 includes objects that are within a second predetermined distance range (e.g., between one meter and two meters) from the front plane 322. The far-depth zone 354 includes objects that are within a third predetermined distance range (e.g., greater than two meters) from the front plane 322. One of ordinary skill in the art would appreciate that the local area 310 may include any number of depth zones of different sizes, each of which may include objects within a predetermined distance range.

In some embodiments, the controller 308 divides the local area 310 into a fixed number of depth zones and identifies objects in each depth zone. For example, the controller 308 divides the local area 310 into three depth zones: the near-depth zone 350, the mid-depth zone 352, and the far-depth zone 354. The controller 308 locates objects of the local area 310 in each depth zone. For example, the controller 308 regulates the illumination source 304 to emit one or more light pulses for each depth zone, and regulates the imaging device 306 to capture respective reflected light thereby to generate image data. For a given depth zone, the controller 308 may analyze the image data to identify objects in the given depth zone. The controller 308 associates the identified objects with a depth information attributed to the depth zone they are located in. For example, a distance of an object to the DCA 120 is based on a time difference between the illumination source 304 emitting a light pulse and a start time of the exposure period. As light travels at a fixed speed in air (e.g., $3 \times 10^8$ meters/second), the distance to a depth zone is half of the interval light travels during the time difference. Accordingly, the controller 308 may attribute depth information to objects identified in a given depth zone.

In some embodiments, the controller 308 may automatically divide the local area 310 into a relatively large number of depth zones (e.g., each corresponding to an inch) and generate image data for each of the depth zones. The controller 308 identifies which depth zones include objects and generates a new set of depth zones that emphasize the identified objects, and not the empty space between the identified objects. For example, areas that include objects may be associated with a large number of depth zones, however, empty space between objects may be associated with low number of depth zones (e.g., a single depth zone).

In alternate embodiments, the controller 308 divides the local area 310 into a relatively low number of large depth zones (e.g., 3). The controller 308 identifies which depth zones include objects, and divides the identified depth zones into smaller depth zones. The controller 308 again identifies which of the smaller depth zones include objects, and further divides the identified smaller depth zones into even smaller depth zones. The controller 308 continues this process until some threshold level of depth resolution is obtained.

The controller 308 may further adjust a size of a depth zone based on the objects located in that depth zone. The size of the depth zone is determined by a near border (i.e., a border having the shortest distance to the front plane 322) and a far border (i.e., a border having the longest distance to the front plane 322.) For example, the controller 308 adjusts the near (far) border of a depth zone to the location of the object having the shortest (longest) distance among all objects identified in the depth zone.

The controller 308 may further determine an object's reflectivity based on the light reflected off the object and captured by the imaging device 306. A higher reflectivity object is brighter than a lower reflectivity object under the same or similar irradiance and distance. For example, for an object, the controller 308 generates an image of the object and compares the received signal of the image of the object to a threshold value associated with the distance of the object. When the brightness is greater (less) than the threshold value, the controller 308 determines the reflectivity of the object is high (low). In addition, through temporal data collection, the estimation of reflectivity, and more accurately the object Bi-Directional Reflectance Distribution Function (BRDF), can be continuously refined to support tracking, mapping, and ensuring the emitted illumination signal is within an acceptable range for the objects characteristics. In addition, the controller 308 may determine movement of an object relative to the DCA 120. For example, the controller 308 identifies changes in locations of an object from one image to another image to determine movement of the object. The controller 308 compares a speed of movement of the object to a threshold speed. When the speed is greater (less) than the threshold speed, the controller 308 determines the movement of the object is high (low).

The controller 308 determines one or more illumination parameters based on a depth zone, object(s) included in the depth zone, an image resolution, and/or image quality. The image resolution may be configured by a user. For example, the controller 308 regulates the illumination source 304 to emit light pulses having a lower (higher) amplitude to capture images of the near-depth zone 350 (the far-depth zone 354). Because the intensity of a light beam attenuates over time when it travels through various volumes of materials in the local area 310, objects that are more distant from the front plane 322 are lit by light of less intensity than those closer to the front plane 322. In addition, when working within a single identified depth zone, an estimate of the ambient illumination properties in the other (not active illuminated) depth zones can be determined. This supports ambient subtraction methods when subsequent image frames provide active illumination in those respective depth zones.

As another example, the controller 308 regulates the illumination source 304 to emit light pulses having a lower (higher) amplitude to capture images of a depth zone of which the object(s) included have high (low) reflectivity. As a further example, the controller 308 regulates the illumination source 304 to emit a light pulse of which the quantity of single pulses is lower (higher) to capture images of a depth zone of which the movement of the object(s) is low (high). The controller 308 regulates the illumination source 304 to emit a light pulse of which the repeat frequency is lower (higher) to capture images of a depth zone of which the movement of the object(s) is low (high). Images of different objects included in a depth zone may have different brightness due to the distances and/or reflectivity of the objects under the same illumination. Images of the bright object(s) saturate when the differences in brightness exceed the dynamic range of the imaging device 306. As yet a further example, the controller 308 may regulate the illumination source 304 to emit a light pulse of which the quantity of single pulses is lower (higher) to capture images of lower (higher) resolution.

The controller 308 may further determine the one or more illumination parameters to ensure image quality. The controller 308 analyzes image quality (e.g., noise, contrast, sharpness, etc.) of the captured images. For example, the controller 308 analyzes the captured images to determine a noise measure (e.g., Gaussian noise, salt and pepper noise, shot noise, quantization noise, film grain, etc.) and determines the illumination parameter(s) to ensure that the noise measure is below a threshold. As another example, the controller determines a signal to noise ratio (SNR) of the measured image and determine the illumination parameter(s) to ensure that the SNR is above a threshold. As a further example, the controller 308 analyses the captured images to determine a contrast measure (e.g., luminance contrast, color contrast) and determines the illumination parameter(s) to ensure that the contrast measure is above a threshold. The controller 308 may further determine the illumination parameter(s) to maximize the image quality of the captured images such as to minimize a noise measure, to maximize a SNR, and/or to maximize a contrast measure of a captured image. To improve or to enhance image quality of captured images, the controller 308 regulates the illumination source 304 to emit a light pulse that has a higher amplitude, that has a higher quantity of single pulses, or that has a higher repeat frequency.

The controller 308 monitors the identified depth zones, for example, by analyzing image data generated for the depth zones. Because objects may move, the controller 308 monitors the identified objects and adjusts the determined depth zones. For example, responsive to determining that an object has moved, the controller 308 determines an updated distance of the object and uses the updated distance to adjust one or more depth zones. For instance, the controller 308 may adjust the near border and/or the far border a depth zone to which the identified object belong through determining that the object becomes the closest or furthest object of the depth zone. The controller 308 may further create a new depth zone when an object moves into a predetermined distance range of the new depth zone. The controller 308 may remove a depth zone when the last object moves outside the predetermined distance range of the depth zone.

The controller 308 may further adjust regulating the imaging device 306 and the illumination source 304 based on the adjusted depth zones to capture images of the depth zones. That is, the controller 308 may adjust one or more illumination parameters and/or one or more exposure parameters to capture images of the depth zones. In this manner, whenever the illumination source 304 is activated, it can send a single or a series of pulses into any predefined or determined range of interest for the imaging device 306 to synchronize the integration window(s). This allows a finer control on the received signal (to be within the prescribed dynamic range of the imaging device 306), while still utilizing an affordable pulsed led or laser technology that is also eye-safe to users. In turn, the imaging device 306 can synchronize the integration windows appropriate to the range or ranges of interest in any given frame, and record/collect light at times associated with each pulse associated with each of the range or ranges of interest. This supports charge summation during any given pulse window multiple times for any frame, all in the analog domain of the detector (in current CCD or CMOS architectures), which minimizes any potential digital or read noise artifacts and increases the signal of interest by not integrating ambient signals (noise source) between pulses.

Each image or image data can be associated with a particular depth zone. Image data may include one or more identified objects. For a given image data associated with a depth zone, the controller 308 determines the pixel values in the given image data that correspond to objects in the associated depth zone. The controller 308 associates depth information for the depth zone to the pixel values corresponding to the depth zone to generate a partially augmented image. A partially augmented image includes image data for some, but not all, of the depth zones in a local area. The controller 30 may generate a partially augmented image for each of the depth zones (e.g., near 350, mid 352, and far 354) in the local area 310, and may combine the partially augmented images into an augmented image that includes depth information for the imaged portion of the local area. In some embodiments, the augmented image and/or a partially augmented image may be combined with an RGB image of the local area 310. Image data is used to generate partially augmented images, and in some embodiments, partially augmented images and/or augmented images include metadata describing for e.g., illumination parameters and/or exposure parameters used to generate the image data. In alternate embodiments, the controller 308 generates augmented images of the local area 310 by integrating the partially augmented images (for all of the depth zones) while maintaining the depth information associated with each pixel. The controller 308 provides augmented images to the augmented reality console 110.

Figure 4:
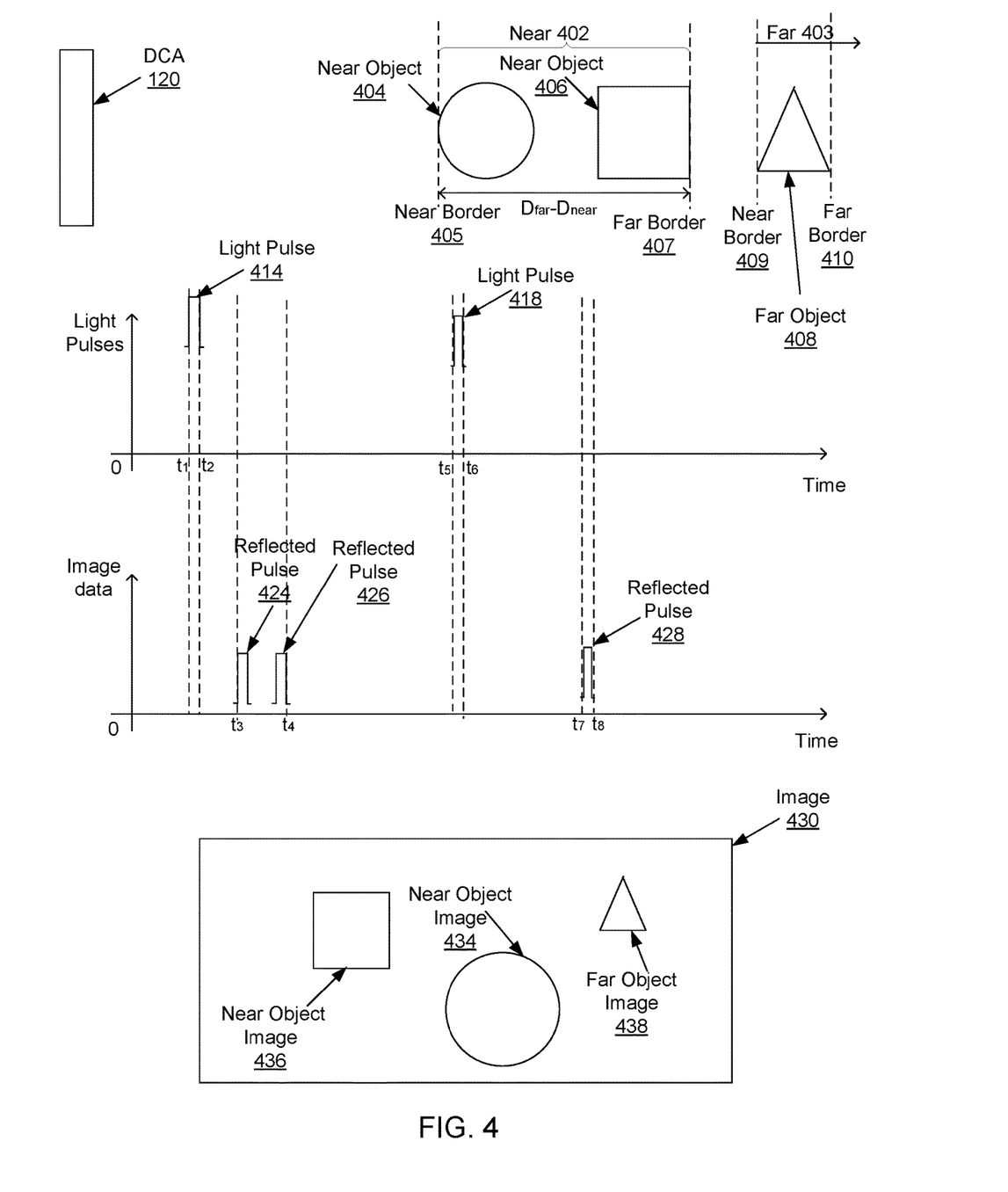
FIG. 4 illustrates an example DCA capturing image data of a scene including different objects at different distances, in accordance with an embodiment.

FIG. 4 illustrates an example DCA 120 capturing image data of a local area including one or more depth zones. The DCA 120 scans the local area and identifies a first near object 404, a second near object 406, and a far object 408. The DCA 120 also determines the location and the distance of each object from the DCA 120. In addition, the DCA 120 may determine the reflectivity and/or the movement of each object relative to the user. Based on, for example, the distance of the identified objects, the DCA 120 divides the scene into depth zones: (1) a near-depth zone 402 including the first near-distance object 404 and the second near-distance object 406, and (2) a far-depth zone 403 including the far-distance object 408.

The DCA 120 captures an image of a depth zone at one time and captures images of different depth zones at different times. At $t_1$, the DCA 120 emits a single light pulse 414 to capture an image of the near-depth zone 402. The DCA 120 may determine one or more illumination parameters of the light pulse 414 based on the near-depth zone 402, the first and second near objects 404 and 406, and/or the image resolution. For example, the DCA 120 determines that the light pulse 414 includes one single light pulse and has a pulse width of $t_1$-$t_2$. The DCA 120 determines one or more exposure parameters to generate image data from the near-depth zone 402. Based on a near border 405 of the near-depth zone 402, the DCA 120 determines $t_3$ as an exposure start time and regulates its imaging device to capture the reflected light pulse 424 at $t_3$. The reflected light pulse 424 is the light pulse 414 being reflected off the near-distance object 404. A time period from $t_1$ to $t_3$ is the time period it takes for the light pulse 414 to travel from the DCA 120 to the near border 405 of the near-depth zone 402 and back to the DCA 120. That is, the one half of the time period from $t_1$ to $t_3$ corresponds to a distance to the near border 405 from the DCA 120. In addition, the DCA 120 determines the exposure duration. In capturing image data for the near depth zone 402, the exposure duration corresponds to the distance between the near border 405 and a far border 407. The reflected light pulse 426 is the light pulse 414 being reflected off the near object 406. The time period from $t_3$ to $t_4$ is the time period between a first time point when the rising edge of the light pulse 414 arrives at the near border 405 and a second time point when the falling edge of the light pulse 414 arrives at the far border 407.

For the near depth zone 402, the DCA 120 generates image data using the determined exposure start time and exposure time period. The near depth zone 402 is associated with depth information corresponding to a distance to the near depth zone 402 (or some point within the near depth zone 402). The DCA 120 generates a partially augmented image by mapping pixel values of objects in the image data to the depth information associated with the near depth zone 402.

The DCA 120 then shifts focus toward the far depth zone 403. At $t_5$, the DCA 120 emits a single light pulse 418 to capture an image of the far-depth zone 403. The DCA 120 may determine one or more illumination parameters of the light pulse 418 based on the far-depth zone 403, the far object 408, and/or the image resolution. For example, the DCA 120 determines that the light pulse 418 includes one single light pulse and has a pulse width of $t_5$-$t_6$. The DCA 120 determines one or more exposure parameters to generate image data from the far-depth zone 403. Based on a near border 409 of the far-depth zone 403, the DCA 120 determines $t_7$ as an exposure start time and regulates its imaging device to capture a reflected light pulse 428 at $t_7$. The reflected light pulse 428 is the light pulse 418 being reflected off the far object 408. A time period from $t_5$ to $t_7$ is the time period it takes for the light pulse 418 to travel from the DCA 120 to the far border 410 of the far-depth zone 403 and back to the DCA 120. In addition, the DCA 120 determines the exposure duration. In capturing image data for the far depth zone 403, the exposure duration corresponds to the distance between the near border 409 and a far border 410. The time period $t_7$-$t_8$ is the time period between a first time point when the rising edge of the light pulse 418 arrives at the near border 409 and a second time point when the falling edge of the light pulse 418 arrives at the far border 410.

For the far depth zone 403, the DCA 120 generates image data using the determined exposure start time and exposure time period. The far depth zone 403 is associated with depth information corresponding to a distance to the far depth zone 403 (or some point within the far depth zone 403). The DCA 120 generates another partially augmented image by mapping pixel values of objects in the image data to the depth information associated with the far depth zone 403.

The DCA 120 generates an augmented image using both of the partially augmented images. The DCA 120 combines the partially augmented images into an augmented image that includes depth information for the imaged portion of the local area (i.e., the near depth zone 402 and the far depth zone 403). In some embodiments, the augmented image and/or a partially augmented image may be combined with an RGB image of the local area 310. The DCA 120 may further operate with a spatially modulated signal for the illumination source, which provides for a structured light depth retrieval method (utilize triangulation, or a known baseline distance between the illuminator and camera to determine a depth calculation). This allows the system to work with both temporally (pulsed light, either single or multiple per frame as described) and spatially modulated light sources to refine the depth retrieval estimation.

Note, that in the above example, for a given depth zone, a single pulse is primarily used to generate a partially augmented image. However, in alternate embodiments, multiple pulses are emitted for a given depth zone before reading out image data associated with the depth zone. This improves a signal strength associated with image data in the given depth zone, as light from successive pulses are added in a near noiseless fashion. The DCA 120 can then read out image data associated for the depth zone that was generated using a plurality of pulses (e.g., 100 pulses). The improved signal strength is useful in capturing accurate image data for objects with low reflectivity and/or objects that are distant from the DCA 120.

Figure 5:
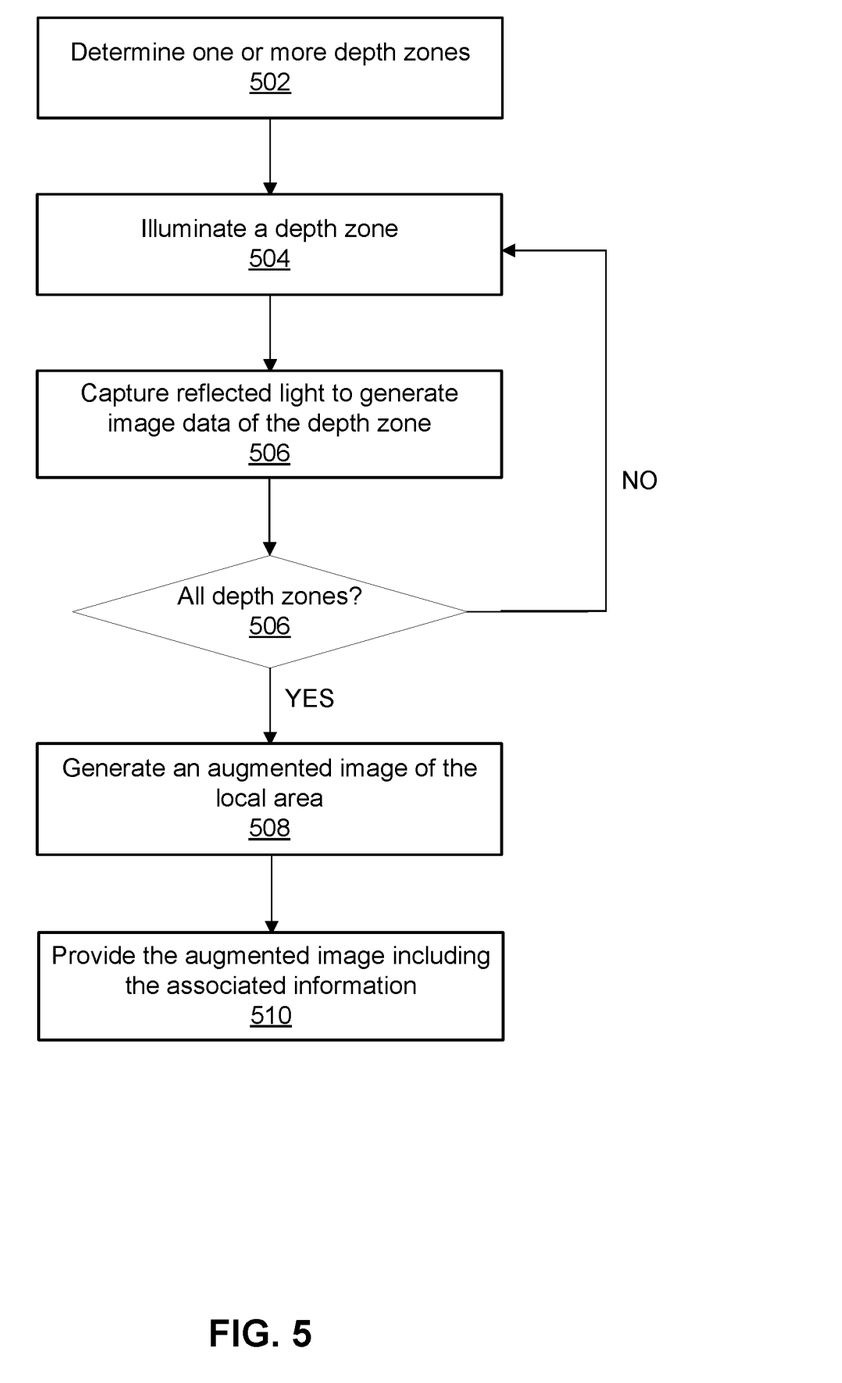
FIG. 5 illustrates a flow diagram of a process of generating augmented images, in accordance with an embodiment.

FIG. 5 illustrates a flow diagram of a process of generating augmented images, according to an embodiment. The process of FIG. 5 may be performed by the DCA 120. Other entities may perform some or all of the steps of the process in other embodiments. Likewise, embodiments may include different and/or additional steps, or perform the steps in different orders.

A DCA determines 502 one or more depth zones in a local area. Each depth zone has different depth information (e.g., object(s) included and the respective distance to the DCA 120). The DCA identifies objects included in the local area and determines a distance of each identified object to the DCA. The DCA further divides the local area into one or more depth zones based on the determined distance of the identified objects.

The DCA illuminates 504 a depth zone, of the one or more depth zones, that includes one or more objects. The DCA may regulate its illumination source to emit a light pulse to illuminate the depth zone. The DCA may determine one or more illumination parameters (e.g., a pulse width, an amplitude, a frequency, a quantity of pulses included, and/or a wavelength) and regulate its illumination source according to the determined illumination parameters. The DCA may determine one or more illumination parameters based on the depth zone, object(s) included in the depth zone, and/or an image resolution. In one embodiment, the DCA emits a light pulse of which the width is 6 ns or shorter.

The DCA captures 506 light reflected off objects in the depth zone to generate image data of the depth zone. The DCA regulates its imaging device to capture light reflected off the objects in the depth zone responsive to being illuminated by the light pulse emitted by its illumination source. The DCA may determine one or more exposure parameters (e.g., start time, duration, etc.) and regulate its imaging device according to the determined illumination parameters. The DCA may determine one or more exposure parameters based on the depth zone and/or the corresponding light pulse emitted. The generated image data include pixel values (e.g., RGB values) for pixels of an image of the depth zone. The DCA may monitor the depth zone based on the generated image data. The DCA may adjust one or more illumination parameters, one or more exposure parameters, a near border of the depth zone, and/or a far border of the depth zone and adjusts the illumination of a depth zone accordingly.

The DCA determines 506 whether it has generated image data for all identified depth zones, for example, within the DCA's range or based upon its sampling basis and knowledge from previous data sets on objects of interest locations. If image data for all identified depth zones has not been generated, the process flow moves to 504, and a different depth zone is illuminated.

Responsive to determining that image data has been generated for all identified depth zones, the DCA generates 508 an augmented image of the depth zone based on the image data and the depth information for all identified depth zones. The DCA determines partially augmented images for the image data associated with different depth zones, and combines the partially augmented image data into an augmented image. The DCA provides 510 the augmented image of the local area to an AR console for further processing.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A range-gated depth camera assembly, comprising:
an illumination source configured to emit illumination light pulses;
an imaging device configured to capture a plurality of images of a local area; and
a controller configured to:
responsive to a determination that a contrast measure of an image of the plurality of images is below a contrast threshold value, adjust one or more illumination parameters, the one or more illumination parameters comprising at least an amplitude of the light pulses and a quantity of the light pulses;
regulate the illumination source to emit a plurality of illumination light pulses to illuminate a scene of the local area according to the one or more illumination parameters, the local area being divided into a plurality of depth zones comprising at least one non-empty depth zone, the non-empty depth zone comprising at least one object;
for each non-empty depth zone of the plurality of depth zones, regulate the imaging device to record a set of reflected light pulses to generate image data for the non-empty depth zone, the set of reflected light pulses being the illumination light pulses reflected off one or more objects included in the non-empty depth zone; and
generate one or more partially augmented images of the scene using the image data generated for the at least one non-empty depth zone of the plurality of non-empty depth zones,
wherein at least one of the one or more partially augmented images include depth information for the at least one object, and the one or more partially augmented images are used to generate virtual content for presentation to a user.

2. The range-gated depth camera assembly of claim 1, wherein a first exposure time period for a first depth zone of the depth zones is different from a second exposure time period for a second depth zone of the depth zones, the first depth zone different from the second depth zone.

3. The range-gated depth camera assembly of claim 1, wherein generating the one or more partially augmented images of the scene comprises associating the image data of a depth zone with depth information of the depth zone.

4. The range-gated depth camera assembly of claim 1, wherein the controller is further configured to adjust the one or more illumination parameters based at least on one of a distance from the imaging device to one depth zone of the depth zones and a quality of the image of the plurality of images.

5. The range-gated depth camera assembly of claim 1, wherein the controller is further configured to
adjust the one or more illumination parameters based on at least one of a degree of reflectivity of an object, a speed of motion of the object, a distance of the object from the imaging device, a noise measure of the image, and a signal to noise ratio (SNR) of the image, the one or more illumination parameters comprising at least one of a pulse width of the light pulses, an amplitude of the light pulses, a frequency of the light pulses, a quantity of the light pulses, and a wavelength of the light pulses.

6. The range-gated depth camera assembly of claim 1, wherein the controller is further configured to regulate the imaging device according to one or more exposure parameters and the controller is further configured to:

determine updated one or more exposure parameters based at least on an illumination parameter of the illumination source and characteristics of the depth zones; and adjust the one or more exposure parameters according to the updated one or more exposure parameters, the one or more exposure parameters comprising at least one of an exposure time period, a start time for the exposure time period, a repetition frequency for every read-out frame, and a repetition count for every read-out frame.

7. The range-gated depth camera assembly of claim 1, wherein the controller is further configured to:
divide the local area into the plurality of depth zones, wherein a number of the plurality of depth zones is predetermined; and
for each non-empty depth zone of the plurality of depth zones, locate the one or more objects within a predetermined distance range from the imaging device to identify the one or more objects.

8. The range-gated depth camera assembly of claim 1, wherein the controller is further configured to:
divide the local area into a second plurality of predetermined depth zones, a dimension of each predetermined depth zone being predetermined,
identify a plurality of empty depth zones, the plurality of empty depth zones being a subset of the second plurality of predetermined depth zones that include no object, and
combine two of the identified plurality of empty depth zones that are adjacent to each other into a single empty depth zone.

9. The range-gated depth camera assembly of claim 1, wherein the controller is further configured to:
divide the local area into a first set of depth zones,
identify a set of nonempty depth zones, the set of nonempty depth zones being a subset of the first set of depth zones that include at least one object, and
for each nonempty depth zone, divide the nonempty depth zone into a second set of depth zones, a dimension of each depth zone of the second set of depth zones greater than a threshold dimension.

10. The range-gated depth camera assembly of claim 1, wherein the controller is further configured to:
for each depth zone of the plurality of depth zones:
adjust a first border of the depth zone to a first location of a first object, the first object having a shortest distance to the imaging device among the one or more objects included in the depth zone, and
adjust a second border of the depth zone to a second location of a second object, the second object having a longest distance to the image device among the one or more objects included in the depth zone.

11. The range-gated depth camera assembly of claim 1, wherein the controller is further configured to:
detect movement of an object included in a depth zone,
responsive to detecting movement of the object, determine an updated distance from the object to the imaging device, and
generate a second plurality of adjusted depth zones by adjusting the plurality of depth zones based on the updated distance, the adjusting comprising at least one of adjusting a border of a depth zone of the plurality of depth zones, creating a new depth zone responsive to determining that the updated distance is within a first predetermined range, and removing an existing depth zone responsive to determining that the updated distance is outside a second predetermined range.

12. A head-mounted display (HMD) comprising:
an electronic display;
a range-gated depth camera assembly, comprising:
an illumination source configured to emit illumination light pulses, and
an imaging device configured to capture a plurality of images of a local area; and
a controller configured to:
responsive to a determination that a contrast measure of an image of the plurality of images is below a contrast threshold value, adjust one or more illumination parameters, the one or more illumination parameters comprising at least an amplitude of the light pulses and a quantity of the light pulses;
regulate the illumination source to emit a plurality of illumination light pulses to illuminate a scene of the local area according to the one or more illumination parameters, the local area being divided into a plurality of depth zones comprising at least one non-empty depth zone, the non-empty depth zone comprising at least one object;
for each non-empty depth zone of the plurality of depth zones, regulate the imaging device to record a set of reflected light pulses to generate image data for the non-empty depth zone, the set of reflected light pulses being the illumination light pulses reflected off one or more objects included in the non-empty depth zone; and
generate one or more partially augmented images of the scene using the image data generated for the at least one non-empty depth zone of the plurality of non-empty depth zones;
wherein at least one of the one or more partially augmented images include depth information for the at least one object, and the one or more partially augmented images are used to generate virtual content for presentation to a user.

13. The HMD of claim 12, wherein a first exposure time period for a first depth zone of the depth zones is different from a second exposure time period for a second depth zone of the depth zones, the first depth zone different from the second depth zone.

14. The HMD of claim 12, wherein generating the one or more partially augmented images of the scene comprises associating the image data of a depth zone with depth information of the depth zone.

15. The HMD of claim 12, wherein the controller is further configured to adjust the one or more illumination parameters based at least on one of a distance from the imaging device to one depth zone of the depth zones and a quality of the image of the plurality of images.

16. The HMD of claim 12, wherein the controller is further configured to
adjust the one or more illumination parameters based on at least one of a degree of reflectivity of an object, a speed of motion of the object, a distance of the object from the imaging device, a noise measure of the image, and a signal to noise ratio (SNR) of the image, the one or more illumination parameters comprising at least one of a pulse width of the light pulses, an amplitude of the light pulses, a frequency of the light pulses, a quantity of the light pulses, and a wavelength of the light pulses.

17. The HMD of claim 12, wherein the controller is further configured to regulate the imaging device according to one or more exposure parameters and the controller is further configured to:

determine updated one or more exposure parameters based at least on an illumination parameter of the illumination source and characteristics of the depth zones; and adjust the one or more exposure parameters according to the updated one or more exposure parameters, the one or more exposure parameters comprising at least one of an exposure time period, a start time for the exposure time period, a repetition frequency for every read-out frame, and a repetition count for every read-out frame.

18. A method comprising:

determining a contrast measure of an image of a plurality of images of a local area is below a contrast threshold value, the plurality of images captured by an imaging device;

adjusting one or more illumination parameters based on the contrast measure being below the contrast threshold value, the one or more illumination parameters comprising at least an amplitude of a plurality of light pulses and a quantity of the plurality of light pulses;

emitting, by an illumination source, the plurality of illumination light pulses to illuminate a scene of the local area according to the one or more illumination parameters, the local area being divided into a plurality of depth zones comprising at least one non-empty depth zone, the non-empty depth zone comprising at least one object;

for each depth zone of the plurality of depth zones, recording a set of reflected light pulses to generate image data for the non-empty depth zone, the set of reflected light pulses being the illumination light pulses reflected off one or more objects included in the non-empty depth zone; and generating one or more partially augmented images of the scene using the image data generated for the at least one non-empty depth zone of the plurality of non-empty depth zones, wherein at least one of the one or more partially augmented images include depth information for the at least one object, and the one or more partially augmented images are used to generate virtual content for presentation to a user.

19. The method of claim 18, wherein a first exposure time period for a first depth zone of the depth zones is different from a second exposure time period for a second depth zone of the depth zones, the first depth zone different from the second depth zone.

20. The method of claim 18, wherein generating the one or more partially augmented images of the scene comprises associating the image data of a depth zone with depth information of the depth zone.

* * * * *